(12) United States Patent
Shappir et al.

(10) Patent No.: US 6,987,910 B2
(45) Date of Patent: Jan. 17, 2006

(54) SILICON LIGHT WAVEGUIDE WITH MOS CAPACITORS POSITIONED ON THE WAVEGUIDE

(75) Inventors: Josef Shappir, Mevaseret-Zion (IL); Amir Sa'ar, Mevaseret-Zion (IL); Nissim Ben-Yosef, Mevaseret-Zion (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 0 days.

(21) Appl. No.: 10/507,604

(22) PCT Filed: Mar. 13, 2003

(86) PCT No.: PCT/IL03/00212

§ 371 (c)(1),
(2), (4) Date: May 2, 2005

(87) PCT Pub. No.: WO03/077015

PCT Pub. Date: Sep. 18, 2003

(65) Prior Publication Data

US 2005/0220405 A1      Oct. 6, 2005

(30) Foreign Application Priority Data

Mar. 14, 2002   (IL)   ..................... 148716

(51) Int. Cl.
*G02B 6/34*   (2006.01)
(52) U.S. Cl. .............. 385/37; 385/8; 385/131
(58) Field of Classification Search .......... 385/2, 385/3, 8, 14, 16–24, 37, 131–129; 359/121, 359/566–576
See application file for complete search history.

(56) References Cited

U.S. PATENT DOCUMENTS

| | | | |
|---|---|---|---|
| 4,877,299 A | 10/1989 | Lorenzo et al. | 385/3 |
| 4,958,898 A | 9/1990 | Friedman et al. | 385/3 |
| 5,367,177 A | 11/1994 | Taylor et al. | 257/20 |
| 5,838,870 A * | 11/1998 | Soref | 385/131 |

FOREIGN PATENT DOCUMENTS

| | | |
|---|---|---|
| EP | 0607782 | 7/1994 |
| EP | 1030207 | 8/2000 |
| FR | 2647965 | 7/1990 |

* cited by examiner

*Primary Examiner*—Phan T. H. Palmer

(57) ABSTRACT

The present invention provides a silicon wave-guide (3), with a silicon oxide cladding (2, 4) on a silicon substrate (1). At predetermined positions along the length of the wave-guide, are created metal oxide semiconductor (MOS) structures. A poly-silicon, or any other conductive layer (5), is deposited and patterned above the upper cladding (4) and electrical contacts are made to the substrate (1), the silicon wave-guide (3), and the poly-silicon layer (5). Upon the application of a potential difference between at least two of the layers from the group comprising the substrate (1), the silicon wave-guide (3), and the poly-silicon layer (5), the free carrier concentration at the top and/or bottom layer of the silicon wave-guide (3) is changed by the electric field. The change in the electric field results in a change in the index of refraction, and the change in the index of refraction causes a change in the optical mode propagating in the waveguide (3). The propagation is controlled by controlling the changes in the electric field, which can be enhanced by localized changes in the optical properties of the wave-guide (3) induced by ion implantation (6) or trapping of photo-carriers.

15 Claims, 12 Drawing Sheets

SILICON LIGHT WAVEGUIDE WITH MOS CAPACITORS POSITIONED ON THE WAVEGUIDE

RELATED PATENT APPLICATION

This application is a National Phase Application of PCT/IL03/00212 having International Filing Date of 13 Mar. 2003, which claims priority from Israel Patent Application No. 148716 filed 14 Mar. 2002.

FIELD OF THE INVENTION

The present invention is related to the field of electro-optical devices. More specifically, it is related to electro-optical devices monolithically produced on silicon.

BACKGROUND OF THE INVENTION

A critical missing element in the rapid development of the field of optoelectric communications systems is the existence of means for direct electrical control of the optical mode propagating in a slab wave-guide in which the entire structure, both wave-guide and control means, are monolithically created from silicon by using techniques that are fully compatible with current very large scale integrated (VLSI) technologies.

The basic effect needed to supply such a solution is known and is based on the influence of the refractive index of a medium on the wave properties of an electromagnetic wave propagating in the medium. The effect of the free, carriers on the index of refraction in silicon, in a metal oxide semiconductor (MOS) structure has; been demonstrated via the electro-reflectance effect [J. A. Batista, A. M. Mansanares, E. C. da Silva, "Photothermal and Electroreflectance images of biased metal-oxide-semiconductor field-effect transistors: Six different kinds of subsurface microscopy", J. Appl. Phys., 82 (1), pp 423–426 July (1997)]. Also a Mach-Zehnder modulator based on injection of free carriers has been shown [G. V. Treyz, P. G. May, Jean-Marc Halbout, "Silicon Mach-Zehnder waveguide interferometers based on the plasma dispersion effects", Appl. Phys. Lett. 59 (7), pp 771–773 August (1991)]. In addition, the injection of free carriers has been utilized for wavelength de-multiplexing [Baojun Li et. al., "Y-Branch 1.3/1.55 $\mu$m wavelength demultiplexer based on the plasma dispersion effect", Thin Solid Films 369 pp 419–422 (2000)]. However, no previous work on the use of the plasma dispersion effect in MOS capacitor structures for the mode control in optical wave-guides is known to the inventors.

It is therefore a purpose of the present invention to provide electro-optical devices for electrical control of the optical mode propagating in a slab wave-guide which are created monolithically on a silicon substrate.

It is another purpose of the present invention to provide electro-optical devices whose production is based entirely on well-established silicon technology.

It is yet another purpose of the present invention to provide electro-optical devices which operate at gigahertz frequencies.

It is a further purpose of the present invention to provide electro-optical devices whose cost of production is relatively low.

It is a still further purpose of the present invention to provide a method of monolithically producing electro-optical devices for electrical control of the optical mode propagating in a slab wave-guide which are created monolithically on a silicon substrate.

Further purposes and advantages of this invention will appear as the description proceeds.

SUMMARY OF THE INVENTION

The present invention is concerned with providing electro-optical devices based on the electrical field effect in a metal oxide semiconductor (MOS) structure to control the optical mode propagating in a silicon wave-guide. The devices of the invention are fully compatible with current silicon SOI (silicon on insulator) CMOS (complementary metal-oxide semiconductor) technologies. The basic structure of the devices is a silicon wave-guide with silicon oxide cladding. Above the upper cladding a poly-silicon layer is deposited and patterned. Thus along the wave-guide, MOS capacitors are produced over segments of the wave-guide. Upon the application of a potential difference between the silicon wave-guide and the poly-silicon gate electrode, spatial modulation of the free carrier concentration is produced by means of field induced charging of the MOS capacitor. Since the index of refraction of silicon depends on the free carrier concentration, the resulting structure is an electrically switchable wave-guide in which certain sections contain perturbations in the index of refraction.

The field effect can be enhanced by additional predetermined localized changes in the optical properties of the waveguide. These changes are achieved by several methods such as lithographically controlled ion implantation during the wafer processing or by laser interference spatially modulated internal photo emission of electrons in the finished MOS structure which are consequently trapped in pre existing traps, such as an oxide-nitride-oxide (ONO) structure, in the MOS insulating layer [E. Suzuki, H. Hiraishi, K. Ishii, and Y. Hayashi, "A Low-Voltage Alterable EEPROM with Metal-Oxide-Nitride-Oxide-Semiconductor (MONOS) Structures", IEEE Transactions on Electron Devices, Vol. ED-30, No. 2, February, 1983, pp. 122–128].

Examples of the devices employing the structure of the invention are Mach-Zehnder interferometers and Bragg reflectors. The first devices serve as modulators or switches and the second are strongly wavelength selective, depending on the applied voltage and the periodicity and length of ion implantation or charge trapping. The Bragg reflector is the principal element in, for example, a wavelength dependent optical switch. The devices of the invention allow the wave-guide to carry optical signals at different wavelengths. The devices of the invention allow dense wavelength division multiplexing (DWDM), since by switching on the appropriate section only one channel is reflected while the others continue undisturbed.

In a first aspect, the present invention is directed towards providing a silicon wave-guide, with a silicon oxide cladding on a silicon substrate. At predetermined positions along the length of the wave-guide, are created metal oxide semiconductor (MOS) structures, comprising the following layers:

a. a silicon substrate;
   b. a lower silicon-oxide cladding layer covering at least the part of the substrate under the wave-guide.
   c. the silicon waveguide created in a silicon layer formed above the lower silicon-oxide cladding layer;
   d. an upper silicon-oxide cladding layer covering the wave-guide;

e. a poly-silicon or any other conductive layer deposited and patterned above the upper cladding;

f. electrical contacts to the substrate, the silicon wave-guide, and the poly-silicon layer; and g. optionally, a protective dielectric layer;

Upon the application of a potential difference between at least two of the layers from the group comprising the substrate, the silicon wave-guide, and the poly-silicon layer, the free carrier concentration at the top and/or bottom layer of the silicon wave-guide is changed by the electric field. The change in the electric field results in a change in the index of refraction, and the change in the index of refraction causes a change in the optical mode propagating in the waveguide. The propagation is controlled by controlling the changes in the electric field.

In a preferred embodiment of the invention, the silicon substrate, the lower silicon-oxide cladding layer, and the silicon layer in which the wave-guide is created comprise a silicon on insulator (SOI) structure.

The field induced change in the optical mode propagating in the waveguide can be enhanced by additional predetermined localized changes in the optical properties of the waveguide, which can be different for each of the MOS structures created along the length of the wave-guide. The method of achieving the predetermined localized changes can be either:

a. lithographically controlled ion implantation during the wafer processing; or b. laser interference spatially modulated internal photo emission of electrons in the finished MOS structure which are consequently trapped in pre existing traps, for example, in an oxide-nitride-oxide dielectric structure.

In a second aspect, the present invention is directed towards providing an electro-optical device comprising a wave-guide of the type described above. The electro-optical device can be a Mach-Zehnder interferometer or a Bragg reflector. The electro-optical device can perform any of the wavelength selective functions needed in an optical communication system, including: modulation, demodulation, multiplexing, demultiplexing, switching, and routing. The electro-optical device can be comprised of multiple Bragg reflectors, each one designed to induce a change in a different optical mode selected from a multitude of optical modes propagating in the waveguide.

In a third aspect, the present invention is directed toward providing a method for producing the waveguide described above. The method comprises the following steps:

a. choosing a SOI wafer with proper layer thickness;

b. thin thermal oxide growth;

c. thin nitride deposition;

d. photolithography of the waveguide pattern;

e. nitride etch;

f. definition of the waveguide pattern by local oxidation of silicon or by trench isolation;

g. removal of top nitride and oxide;

h. growth of the gate oxide;

i. photolithography of the periodic N+ implant including contact regions;

j. ion implantation of arsenic;

k. poly silicon deposition;

l. poly silicon doping;

m. photolithography of the gate electrode; and n. continuing with standard steps for contacts, metallization and passivation.

All the above and other characteristics and advantages of the invention will be further understood through the following illustrative and non-limitative description of preferred embodiments thereof, with reference to the appended drawings.

DETAILED DESCRIPTION OF PREFERRED EMBODIMENTS

Figure 1:
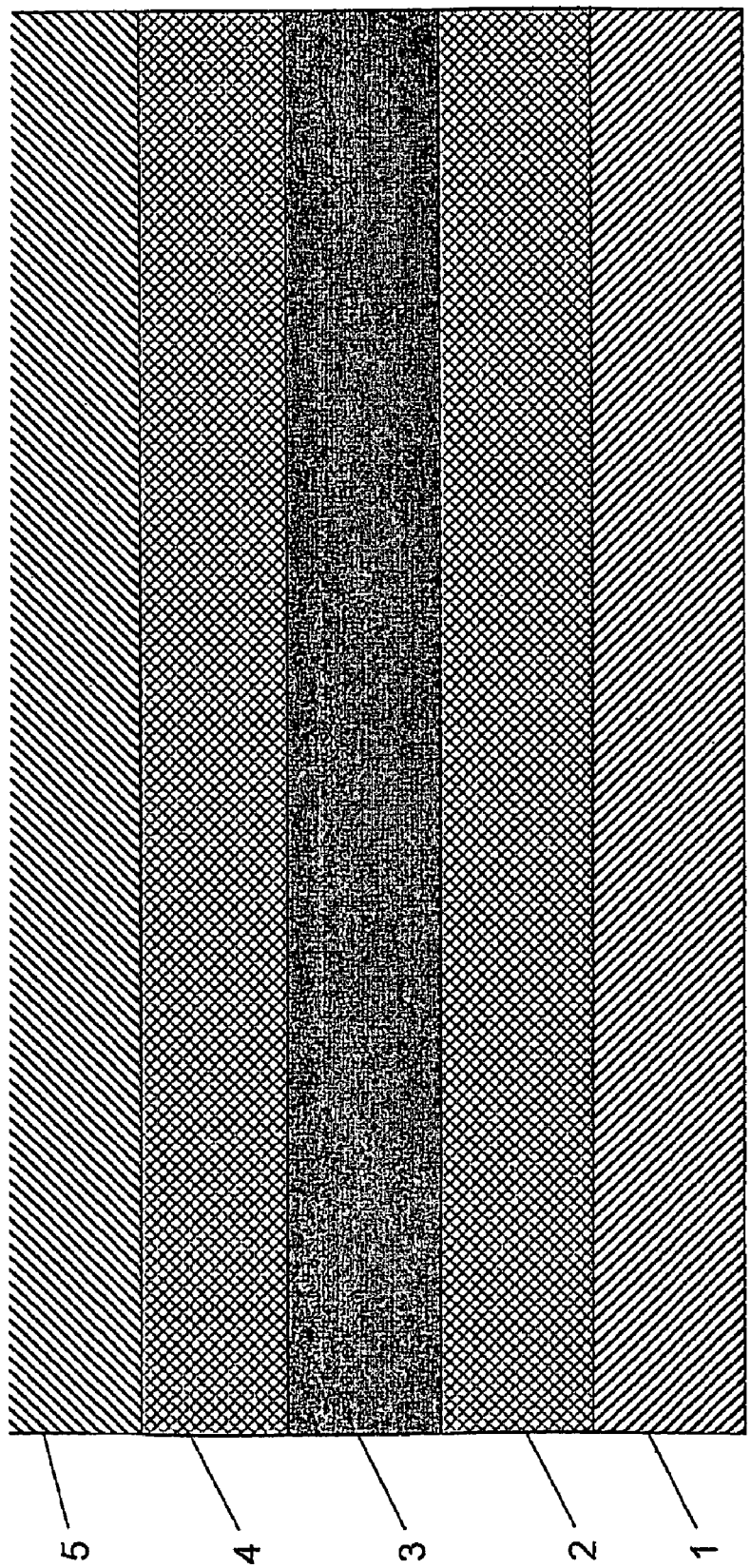
FIG. 1 is a schematic side view of the basic structure of the invention.

FIG. 1 is a schematic side view of the basic structure of the invention. A silicon waveguide 3 is created in the upper layer of a SOI (silicon on insulator) wafer. The lower two layers of the SOI wafer being the silicon substrate 1 and the silicon dioxide layer 2. Above the waveguide is a silicon dioxide upper cladding 4 and above the upper cladding a poly-silicon layer 5 is deposited and patterned to form a poly-silicon electrode. Skilled persons will recognize that any other type of conductive layer may be substituted for the poly-silicon layer.

This basic structure is farther processed in order to make electrical contacts to the substrate, the buried silicon wave-guide and the poly-silicon top layer, which may be covered with a protective layer (not shown in the figures) if desired. This protective layer may be of any suitable dielectric, including oxide.

Figure 2:
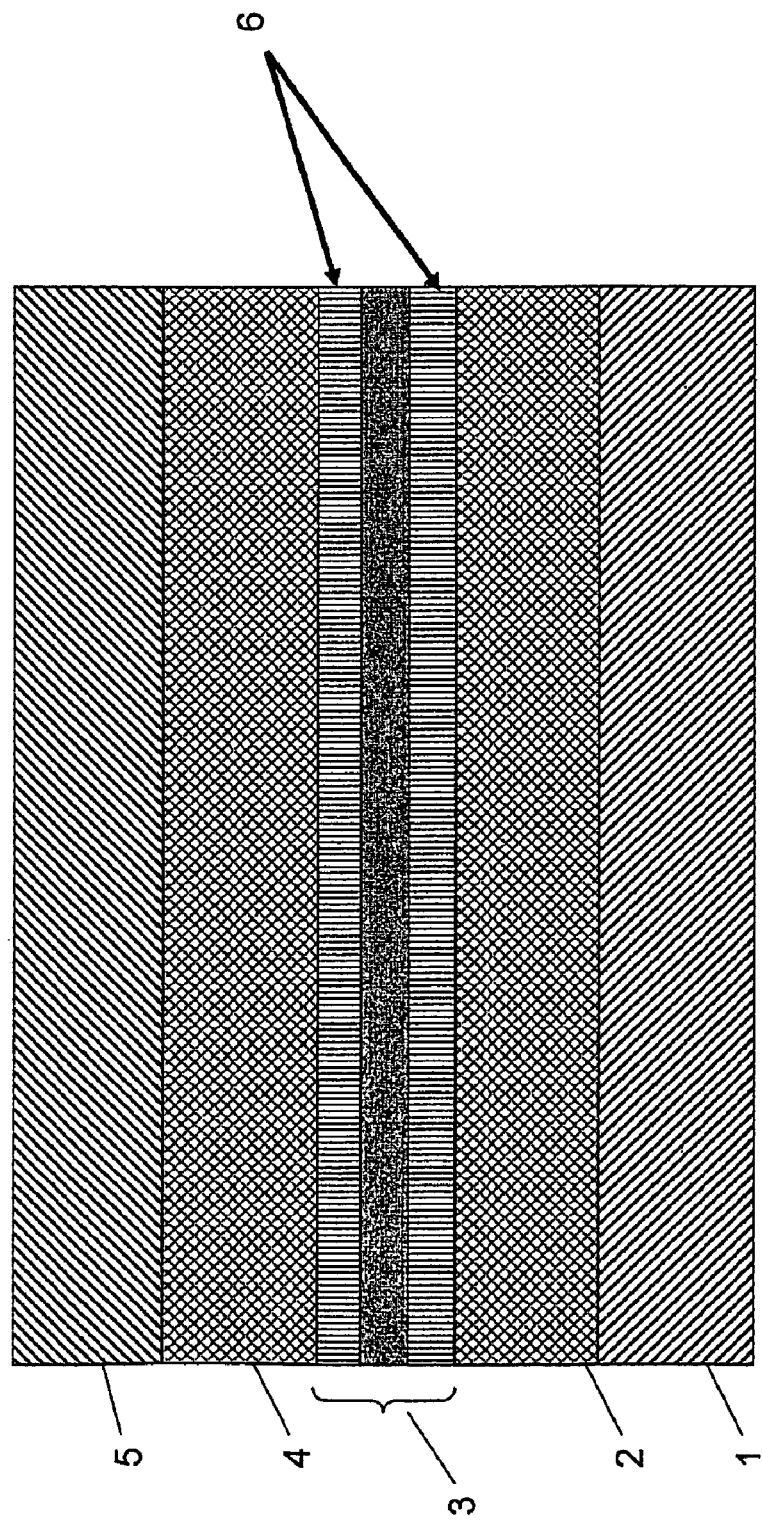
FIG. 2 is a schematic side view showing the regions of modulation of free charge carrier concentration by an electric field.

On application of a potential difference to the silicon wave-guide, relative to the poly-silicon and/or the silicon substrate, the free carrier concentration at the outer edge of the wave-guide is modulated, as depicted by layers 6 in FIG. 2.

The width of the charge accumulation regions is of the order of 100–200 Angstroms, while the volume density can be a few times $10^{18}$ cm$^{-3}$ for field strength for which the oxide layer will not break down.

Figure 3:
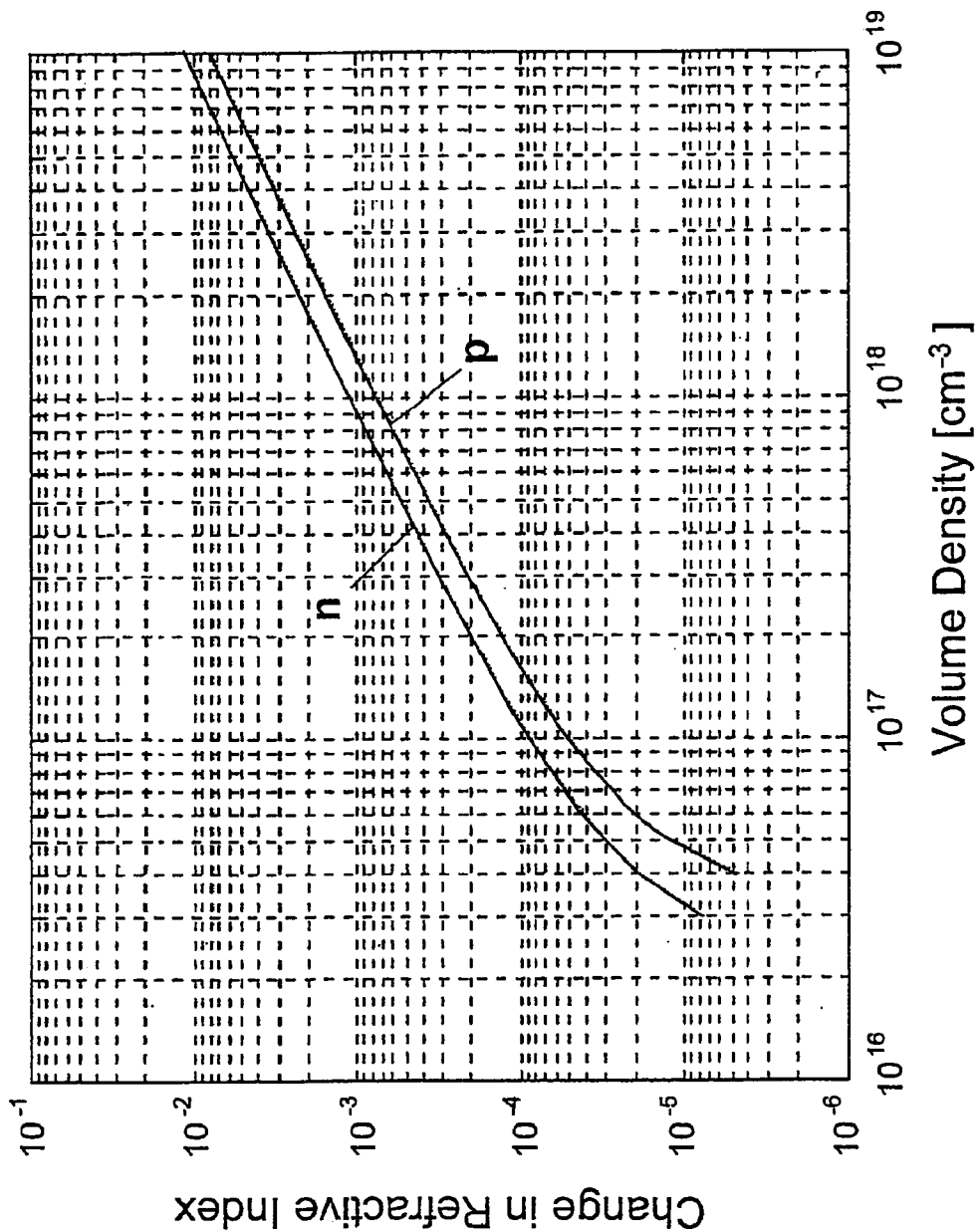
FIG. 3 is a plot of the refractive index changes as a function of free carrier concentration.
Figure 4:
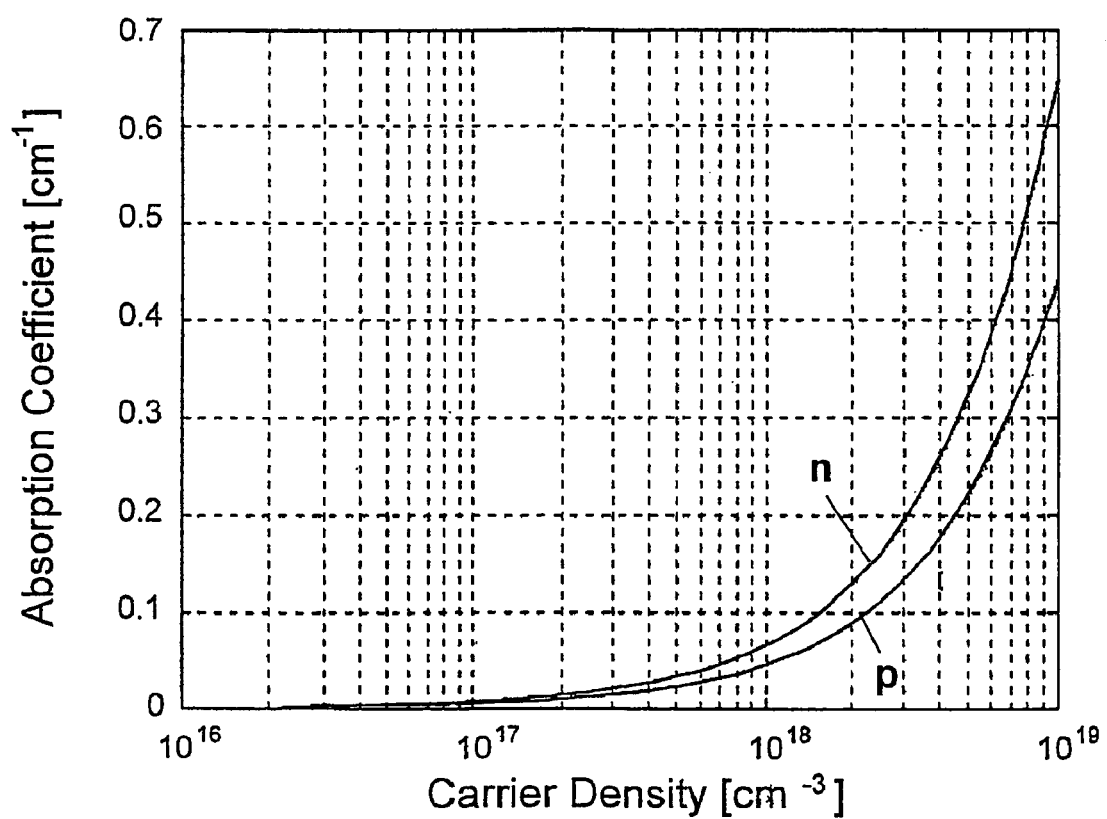
FIG. 4 is a plot of the absorption coefficient as a function of the free carrier density.

These regions have a different index of refraction due to the plasma effect as depicted in FIG. 3, which shows graphically the change in index of refraction as a function of the volume density of the free carriers with respect to intrinsic silicon (index of refraction=3.4205 at 1.5 micron wavelength). FIG. 4 shows graphically the dependence of the absorption coefficient as a function of carrier density. On solving the structure of the optical TE mode propagating in the silicone wave-guide, one finds that the propagation constant along the wave-guide changes with the potential application.

Figure 5:
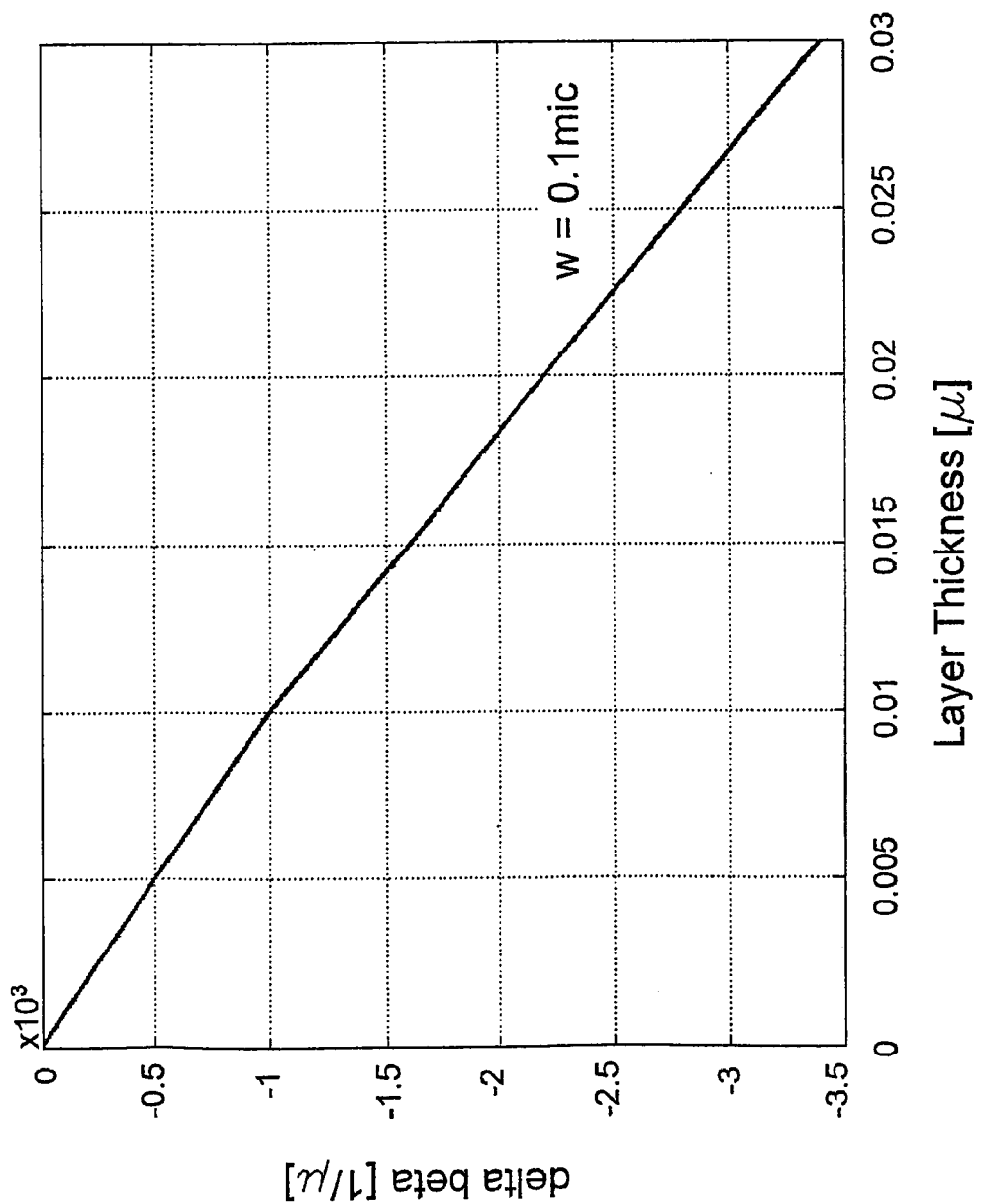
FIG. 5 is a plot of the change of the propagation constant as a function of the layer thickness.

If the propagation of the wave along the silicon wave-guide (the z direction) is of the form $e^{-j\beta z}$, then the change in the propagation constant $\beta$ is depicted in FIG. 5 as a function of layer thickness for a $0.1\mu$ wave-guide thickness and a charge volume density of $10^{18}$ cm$^{-3}$. The physical and mathematical relationships that are needed to produce the results shown in FIGS. 2 to 5 are discussed in more detail hereinbelow with respect to the Bragg reflector.

It can be observed that for a length of about 3 mm and a charge layer of thickness of 100 Angstroms, the change is $\pi$ in the total phase. Thus a phase modulator is formed. Furthermore, if the activated wave-guide of the invention serves as one arm in a Mach-Zehnder interferometer while the second arm is a similar wave-guide with no electrical activation the output will vanish as total destructive interference will occur, forming an amplitude modulator.

Figure 6:
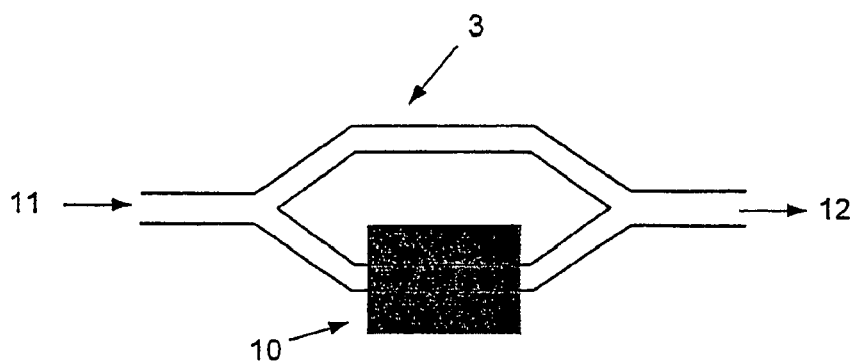
FIG. 6 is a schematic top view of a Mach-Zehnder interferometer, according to a preferred embodiment of the invention.

The top view of a Mach-Zehnder interferometer, according to a preferred embodiment of the invention, depicting only the Si wave-guide and one of the two poly-silicon electrodes is shown in FIG. 6. The structure of the interferometer, according to the invention, is based on a planar wave-guide 3 created in the upper layer of a SOI wafer with poly-silicon electrodes. In one arm of the interferometer, a MOS capacitor 10 whose cross-section is shown in FIG. 1 is created. Arrows 11 and 12 represent the optical input and output respectively.

The width of the silicon planar wave-guide 3 is on the order of $10\mu$, which is wide enough optically to be considered as a planar wave-guide and can be realized with standard photolithography techniques. The length of the interferometer arms are approximately 5 mm long, thus enabling significant modulation depths to be obtained.

The basic configuration described hereinabove, can be applied in a wide range of electro-optic devices such as optical switches, routers, modulators, etc., which are adaptable for use in the DWDM communication approach if they are wavelength selective. Wavelength selectivity can be achieved, according to the invention, by periodic field effect zones of predetermined localized changes in the optical properties of the waveguide. These zones can be created by several methods, such as lithographically controlled ion implantation during the wafer processing or by laser interference spatially modulated internal photo emission of electrons in the finished MOS structure which are consequently trapped in pre existing traps, such as an oxide-nitride-oxide (ONO) structure, in the MOS insulating layer.

As an illustrative and nonlimitative example of these more exotic devices, the basic properties and design considerations of a Bragg reflector operating at a wavelength of $1.51\mu$ will now be discussed. It should be clear to the experienced person that all the detailed dimensions and parameters used in the following description are for sake of illustration only. In principle the values of all of these parameters, including layer thickness, lateral dimensions, doping types, doping levels, etc., can vary widely for purposes of optimization of a particular application.

In order to realize a Bragg filter in the MOS wave-guide one must be able to vary periodically the free carrier distribution along the wave-guide. In a preferred embodiment of the invention, this feature is obtained by periodically ion-implanting the top layer of the silicon wave-guide. The implanted regions will react differently to the applied potential, thus causing a periodic free carrier concentration on the outer layer of the wave-guide.

Figure 7:
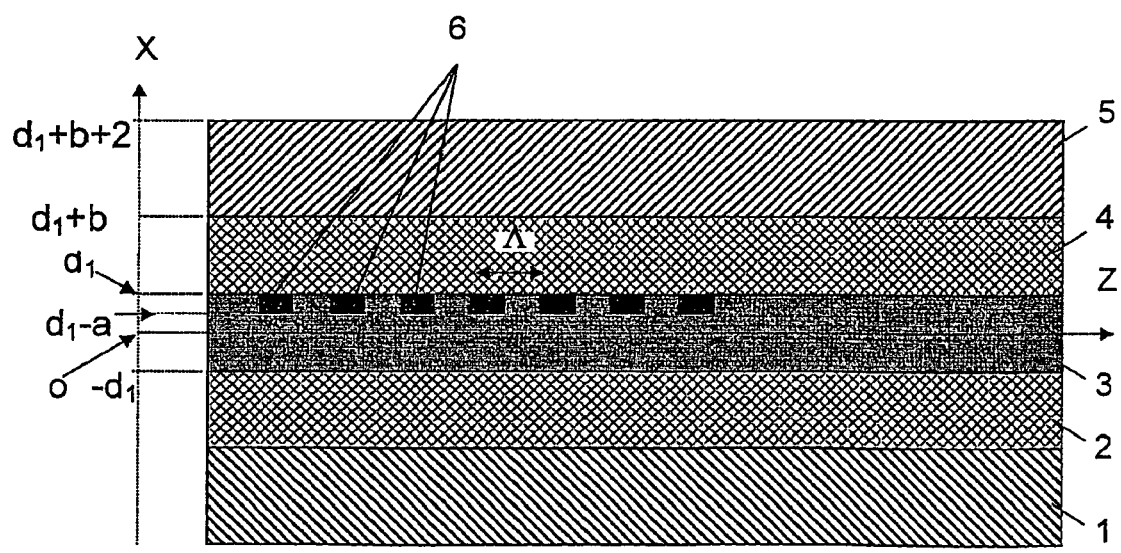
FIG. 7 is a schematic side view of a field induced Bragg reflector according to the invention showing the coordinate system and dimensions.

FIG. 7 is a schematic side view of a field induced Bragg reflector constructed using the structure of the invention showing the coordinate system and dimensions. The basic structure of the device of the invention is a p-silicon waveguide 3 that is created in the upper layer of a SOI (silicon on insulator) wafer. The lower two layers of the SOI wafer being the silicon substrate 1 and the silicon dioxide layer 2.

The p-silicon wave guide 3 has a thickness of $2d_1$ and contains at certain sections along its length, periodic N+ ion implantation regions 6. The depth of the ion implanted N+ region is a, the period of the structure is $\Lambda$ and for sake of simplicity, the width of the implanted N+ region is $\Lambda/2$. Above the waveguide is a silicon dioxide upper cladding 4 having thickness b. Above the upper cladding a poly-silicon layer 5 is deposited and patterned to form poly-silicon electrodes of thickness $2d_2$. Thus along the waveguide, metal oxide semiconductor (MOS) capacitors are produced over the periodic implanted regions. The index of refraction of the silicon layers is $n_s$, that of the oxide layers is $n_o$ and the index of refraction of the perturbed regions is $n_p$.

The device operation is based on the refractive index variations due to the plasma effect of free carriers. The subject is well known [B. Jensen in E. D. Pallick Ed., "Handbook of Optical Constants of Solids", Vol. 1, Academic Press (1985), Chapter 9 pp. 169–170] and can be summarized as follows:

The plasma frequency $\omega_p$ is defined as follows:

$$\omega_p^2 = \frac{Ne^2}{m_{eff}\varepsilon_0\varepsilon_\infty} \text{ in MKS units}$$

with: N the volume density of the free carriers [m$^{-3}$];
e the electron charge; and
$m_{eff}$ the effective mass (electron or hole).

For silicon: $m_e = 0.26 m_0$, $m_h = 0.38 m_0$, $\epsilon_\infty = 11.7$

Let $\tau$ be the mean scattering time, where for silicon $\tau = 10^{-13}$ sec. Define:

$$\eta = 1 + \frac{1}{\tau^2\omega^2}; \quad \varepsilon_1 = \varepsilon_\infty\left(1 - \frac{\omega_p^2}{\omega^2\eta}\right);$$

$$\varepsilon_2 = \frac{\omega_p^2}{\tau\omega^3\eta}; \quad \varepsilon = \sqrt{\varepsilon_1^2 + \varepsilon_2^2}$$

Then:

The real part of the refractive index $$n = \sqrt{(\varepsilon + \varepsilon_1)/2}\,;$$

The imaginary part of the refractive index $$k = \sqrt{(\varepsilon - \varepsilon_1)/2}\,;$$

The absorbtion coefficient $\alpha = 2\omega k/c$; and

The reflectivity $$R = \frac{(n-1)^2 + k^2}{(n+1)^2 + k^2}$$

The plot of the refractive index changes at a wavelength of $1.5\mu$ in silicon as a function of free carrier concentration, and with respect to intrinsic silicon, is shown in FIG. 3, for electrons (top line) and holes (bottom line). The plot of the absorption coefficient at a wavelength of $1.5\mu$ in silicon as a function of the free carrier concentration is seen in FIG. 4, also for electrons (top line) and holes (bottom line).

From FIG. 3, it can be seen that for densities of about $2.10^{18}$ cm$^{-3}$, a change of about 0.002 in the refractive index is expected. And from FIG. 4, it can be seen that, at this density, the absorption coefficient is about 0.1 cm$^{-1}$. Consequently the absorption effects can be neglected for devices having a length of a few mm.

Figure 8:
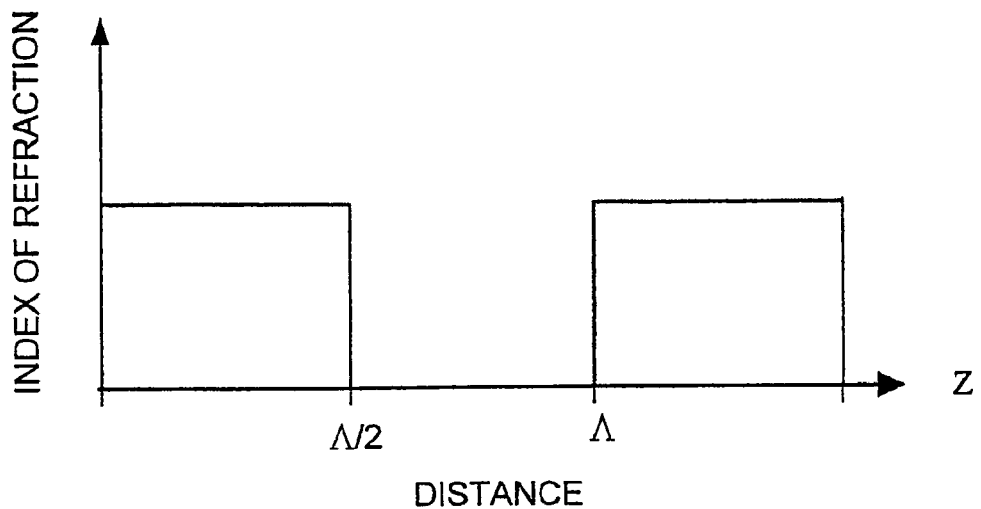
FIG. 8 shows the refractive index at the edge of the waveguide with no field applied.

As shown above, the index of refraction of silicon due to free carriers is derived from the volume concentration of free charge carriers and their type (n or p). In the lowest approximation, the distribution of free charge carriers in the various regions is assumed to be rectangular in shape and field dependent. With no voltage applied, the n-type implanted regions will carry free electrons to a depth a, with a volume concentration of about $2.10^{18}$ cm$^{-3}$. The p-type in the region between implanted regions will carry free holes with volume concentration of about $10^{17}$ cm$^{-3}$. Thus, referring to FIG. 7, the index of refraction changes along the z-axis, to a depth of a in the upper side of the waveguide, look as shown in FIG. 8.

Upon the application of negative voltage to the gate, a depletion region is formed in the n-type regions, thus reducing the index difference in these regions. In the p-type intervals an accumulation of holes will be formed, thus increasing the index difference. Consequently, at some voltage V, the index changes in the two regions will be equal, thus eliminating the index modulation along the z-axis. The amount of reflected light at the selected wavelength is dependent on the applied voltage.

The Bragg reflectors of the invention can thus be used both for separating a signal having a given wavelength from a multitude of different wavelengths traveling along a waveguide and for modulating the signal by varying the voltage. According to a preferred embodiment of the invention, a device for use in an all optical communication system, consists of a multitude of Bragg reflectors, each one designed for a specific wavelength according to the principles described above, which are created in series along the length of the waveguide.

In practice, the charge carriers are not distributed as nicely as depicted. The lateral PN junctions have depletion regions between them but with a period of one half of $\Lambda$, consequently the modulation elimination is not complete. However, the remnant modulation also has a period of one half of $\Lambda$, and thus does not directly interfere with the operation of the device. In order to get the exact shape, detailed simulation of the charge distributions as a function of field intensity is needed.

An optical mode propagating in the waveguide interacts with the index modulation and part of it is scattered. Under proper design, the back scattered fraction from each period interferes constructively with the other back scattered fractions causing a reflection of the mode.

Figure 9:
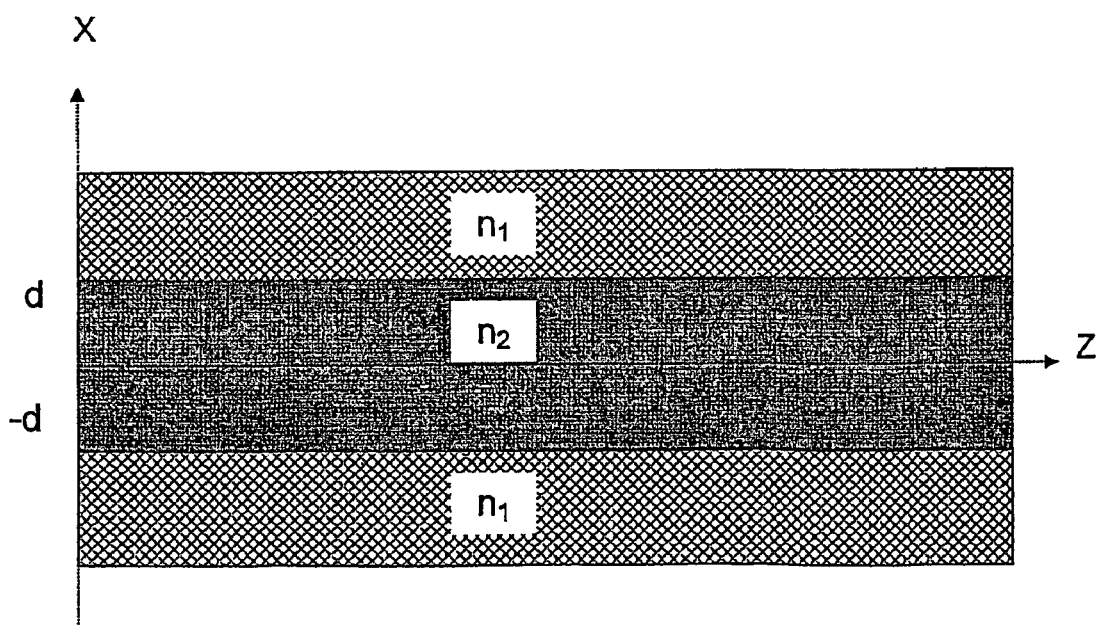
FIG. 9 schematically shows the slab waveguide geometry.

The spatial structure of the relevant mode ($TE_1$) will now be shown. FIG. 9 schematically shows the slab waveguide geometry, where $n_1$ is the index of refraction in the silicon dioxide cladding layers, and $n_2$ is the index of refraction in the waveguide.

The electromagnetic field has to obey the Helmholz equation in the waveguide, as depicted in FIG. 9. It can be shown that the electric and magnetic fields, for the TE modes are as follows:

$$E_y = Ae^{px}e^{pd}e^{-j\beta z}; \quad H_z = \frac{jpA}{\omega\mu}e^{px}e^{pd}e^{-j\beta z};$$

$$H_x = -\frac{\beta}{\omega\mu}E_y; \quad \text{for } x \leq -d.$$

$$E_y = B\cos(hx)e^{-j\beta z}; \quad H_z = -\frac{jhB}{\omega\mu}\sin(hx)e^{-j\beta z};$$

$$H_x = -\frac{\beta}{\omega\mu}E_y; \quad \text{for } -d \leq x \leq d.$$

$$E_y = Ae^{-px}e^{pd}e^{-j\beta z}; \quad H_z = -\frac{jpA}{\omega\mu}e^{-px}e^{pd}e^{-j\beta z};$$

$$H_x = -\frac{\beta}{\omega\mu}E_y; \quad \text{for } x \geq d.$$

Where A and B are integration constants and p, h and $\beta$ are propagation constants. As the fields have to obey boundary conditions at +d and -d, only one integration constant is arbitrary and the relation between the two can be written as:

$$A = B\cos(hd)$$

Furthermore, the boundary conditions impose interrelations among the propagation constants (dispersion relation). They can be written as follows:

$$k_0 = \frac{2\pi}{\lambda}; \quad u = \sqrt{(n_2^2 - n_1^2)k_0^2 d^2}\,;$$

$$(pd)^2 + (hd)^2 = u^2; \quad hd = u \cdot \cos(hd); \quad \text{and}$$

$$\beta^2 = k_0^2 n_2^2 - h^2;$$

Figure 10:
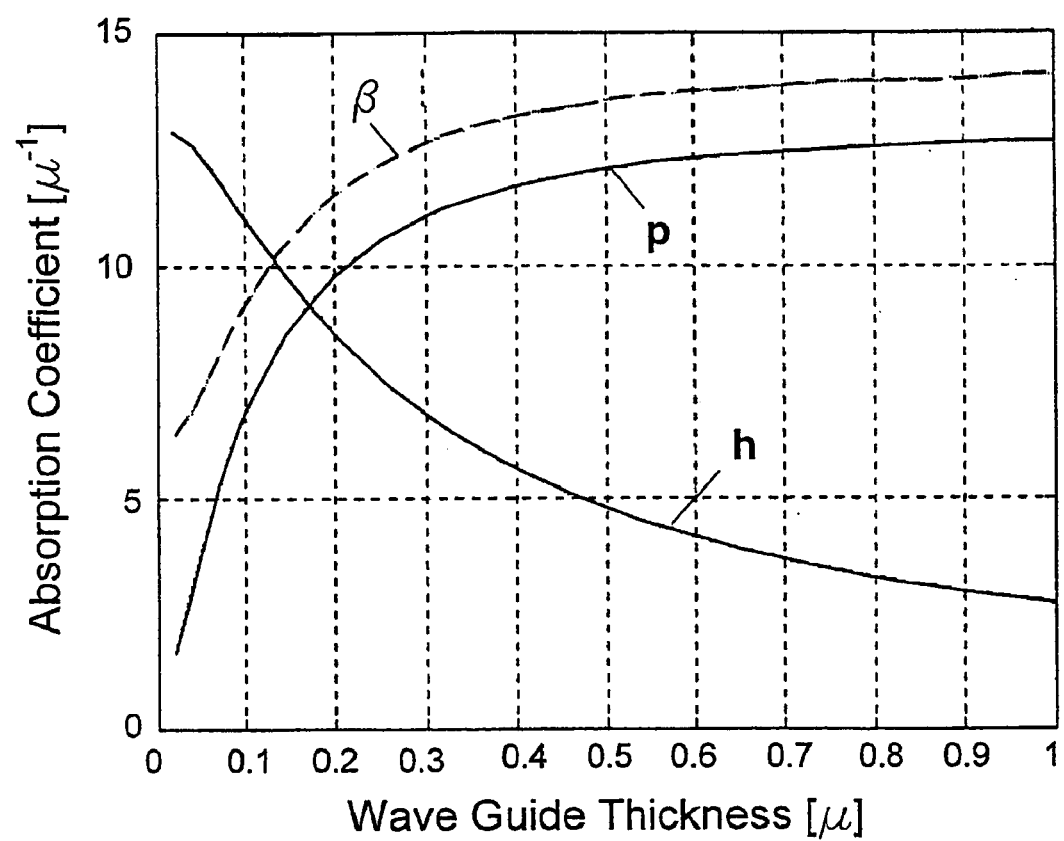
FIG. 10 shows the propagation constants for the $TE_1$ mode in a Si waveguide in oxide as a function of waveguide thickness.

These equations can be solved. The propagation constants for the $TE_1$ mode in a silicon waveguide with oxide cladding as a function of waveguide thickness (2d) are shown in FIG. 10, where p is outside the waveguide and h is inside.

The arbitrary integration constant is chosen so that the power flux per unit length in y, i.e. in the uniform direction, is unity. Meaning:

$$-\frac{1}{2}\int_{-\infty}^{+\infty} E_y H_x^* \, dx = 1$$

On performing the integration and solving, one gets:

$$A^2 = \frac{2\omega\mu p h^2}{\beta(1+pd)(h^2+p^2)};$$

$$B^2 = \frac{2\omega\mu p}{\beta(1+pd)}$$

For the corrugated waveguide, the coupled wave theory (Amnon Yariv, Optical Electronics, Fourth Edition, Saunders College Publishing, pp. 492–499) shows that the coupling constant, between the forward wave and the back reflected wave, is proportional to:

$$\Delta(n^2)\int_{d-a}^{d} E_y^2(x)\,dx = a(n_p^2-n_s^2)\frac{2\omega\mu p h^2}{\beta(1+pd)(h^2+p^2)}$$

And on modifying to include only the first harmonic of the square wave index modulation, one gets the coupling constant κ:

$$\kappa = \frac{2\pi a}{\lambda^2}(n_s^2-n_p^2)\frac{ph^2}{\beta(1+pd)(h^2+p^2)}$$

Applying the coupled wave theory to the mode parameters discussed and calculated above, yields the coupling coefficient which determines the length of the modulation region needed in order to obtain a certain value of the reflection. The general expression for the coupling "constant", which was derived above for the first order, can be written:

$$\kappa_s = \frac{2\pi a}{l\lambda^2}\Delta(n^2)\frac{p_1 h_1^2}{\beta_1(1+p_1 d_1)(p_1^2+h_1^2)}$$

Where, 1 is the modulation grating harmonic order. For the present calculation, the value of I is one. λ is the wavelength (in microns), β, p and h are the propagation constants of the optical mode. The mode dependent part, depends on the waveguide thickness, $2d_1$. These relations are discussed above. From the discussion hereinabove, one can calculate the mode dependent part of the coupling constant as a function of the waveguide thickness. The results of the calculations are shown in FIG. 11 for λ=1.5μ.

Figure 11:
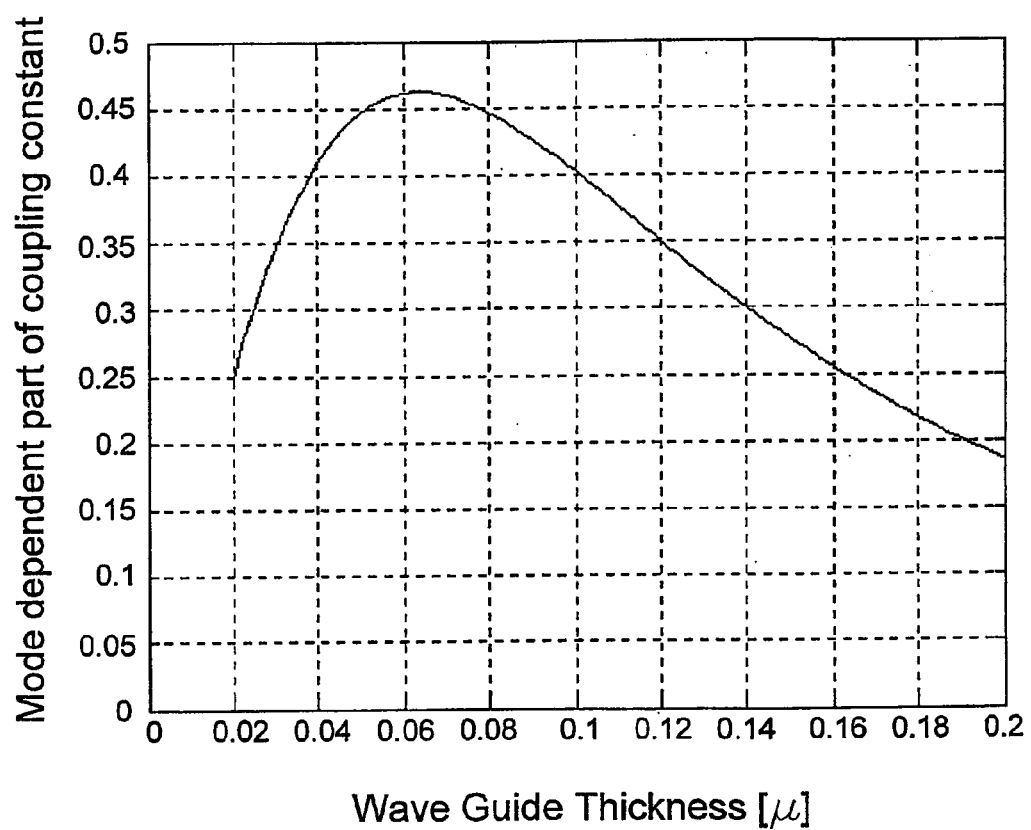
FIG. 11 shows the mode dependent part of the coupling constant as a function of the waveguide thickness.

It can be seen from FIG. 11 that the maximum is obtained for waveguide thickness of 0.064μ. In the remainder of this description, this number will be used for the waveguide thickness. Once this variable, as well as the wavelength have been chosen, all others are obtained from the waveguide theory. The waveguide features can be summarized, as follows:

Waveguide thickness, $2d_1=0.064\mu$, $d_1=0.032\mu$.
Wave-length, λ=1.5μ.
Si refractive index (at λ=1.5μ), $n_s=3.4205$.
Oxide refractive index, $n_o=1.46$.
Refractive index modulation, $\Delta(n^2)=2n\Delta n=2*3.4205*2$ $10^{-3}=0.0137$.
Grating period, $\pi/\beta_1=\Lambda=0.4022\mu$.
N+ region width, $\Lambda/2=0.2011\mu$.
N+ region depth, $a=0.03\mu$.
Z propagation constant, $\beta_1=7.8107\mu^{-1}$.
X propagation constant (inside), $h_1=12.0116\mu^{-1}$.
X propagation constant (outside), $p_1=4.8586\mu^{-1}$.
Auxiliary constant, $u_1=0.4146$.
Coupling constant, $\kappa_s=5.3\ 10^{-4}\mu^{-1}$.

The reflection coefficient of the mode depends on the length of the modulated section as follows:

$$\rho=\tanh(\kappa_s L)$$

Figure 12:
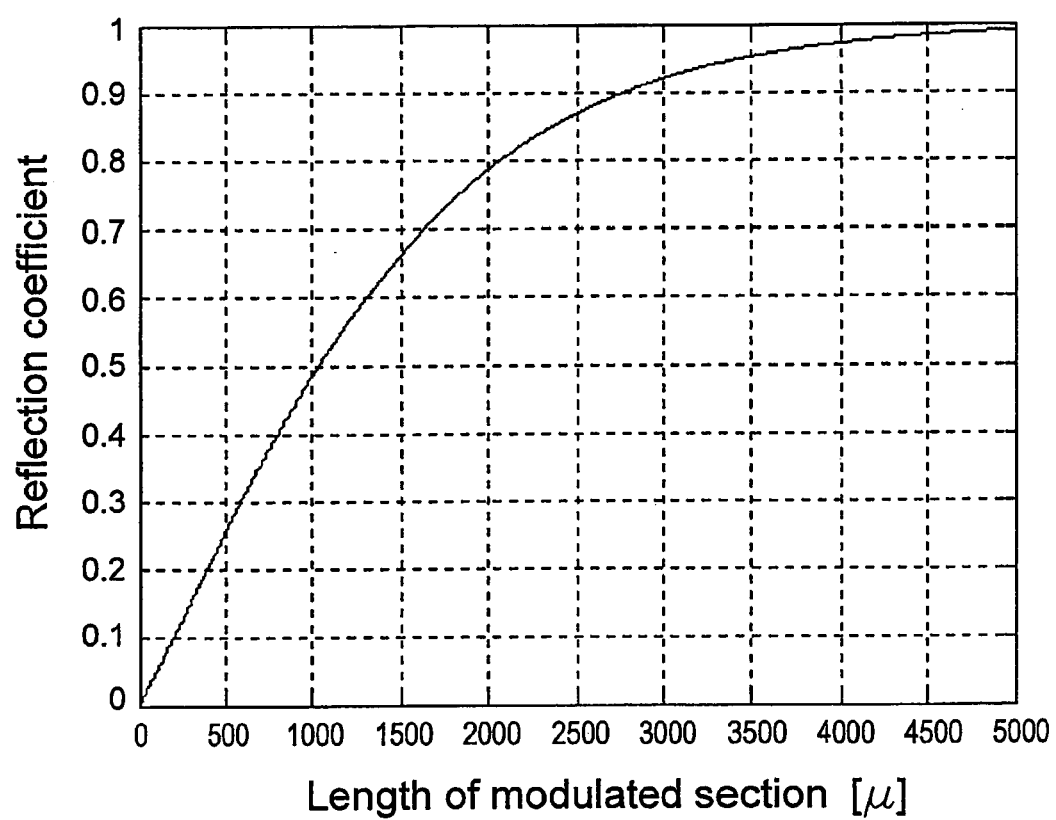
FIG. 12 shows graphically the relationship between the reflection coefficient and the length of the modulated section.

This relationship between the reflection coefficient and the length of the modulated section is shown graphically in FIG. 12.

Figure 13:
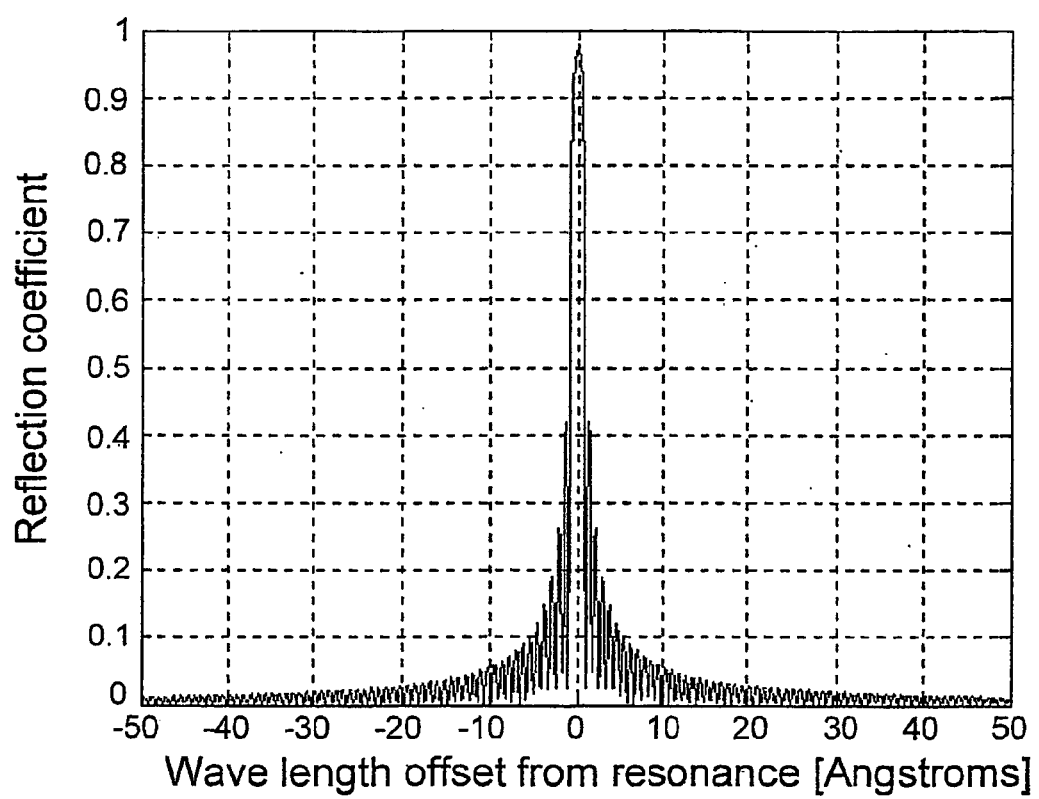
FIG. 13 shows the reflection coefficient as a function of wave-length deviation, for a 4 mm long modulated section of waveguide.

An optical signal at a different wave-length will behave differently as it will be detuned from the grating period. The reflection coefficient as a function of wave-length deviation, for a 4 mm long modulated section of waveguide is shown in FIG. 13. The resonance wavelength is 1.5μ and the offset, or deviation, from the resonance wavelength is measured in angstrom units.

The poly-silicon electrode used for switching the device is in itself an optical waveguide. Since it is situated near the silicon waveguide a coupling can occur and optical energy can flow from the main waveguide to it (and back). If this coupling is strong enough, it will offset the operation of the main waveguide as depicted hereinabove.

The derivation of the relationships governing the amount of optical power that leaks from one waveguide to another adjacent one is straightforward (Saleh and Teich, Fundamentals of Photonics. John Wiley & Sons, Inc., pp. 264–269). The results show that if power is fed to one of the waveguides, along the propagation direction it will leak into the second one, further on, it will leak back to the first and so on. The amount of power behaves as a $\sin^2(\gamma z)$ along the propagation direction. The maximum power fed into the second waveguide is given by:

$$\frac{|e_{12}|^2}{\gamma^2} \text{ with } \gamma^2=(\Delta\beta/2)^2+e_{12}e_{21} \text{ and}$$

$$e_{21}=\frac{1}{2}(n_s^2-n_o^2)\frac{k_0^2}{\beta_1}\cos(h_2 d_2)e^{-p_2(2b+d_1)}\left[\frac{e^{-p_2 x}(-p_2\cos(h_1 x)+h_1\sin(h_1 x))}{p_2^2+h_1^2}\right]_{-d_1}^{+d_1}$$

$$e_{12}=\frac{1}{2}(n_s^2-n_o^2)\frac{k_0^2}{\beta_2}\cos(h_1 d_1)e^{-p_1(2b+d_2)}\left[\frac{e^{-p_1 x}(-p_1\cos(h_2 x)+h_2\sin(h_2 x))}{p_1^2+h_2^2}\right]_{-d_2}^{+d_2}$$

Where the indices 1 and 2 refer to the appropriate waveguide and b, the thickness of the oxide layer, is the distance between the two.

Figure 14:
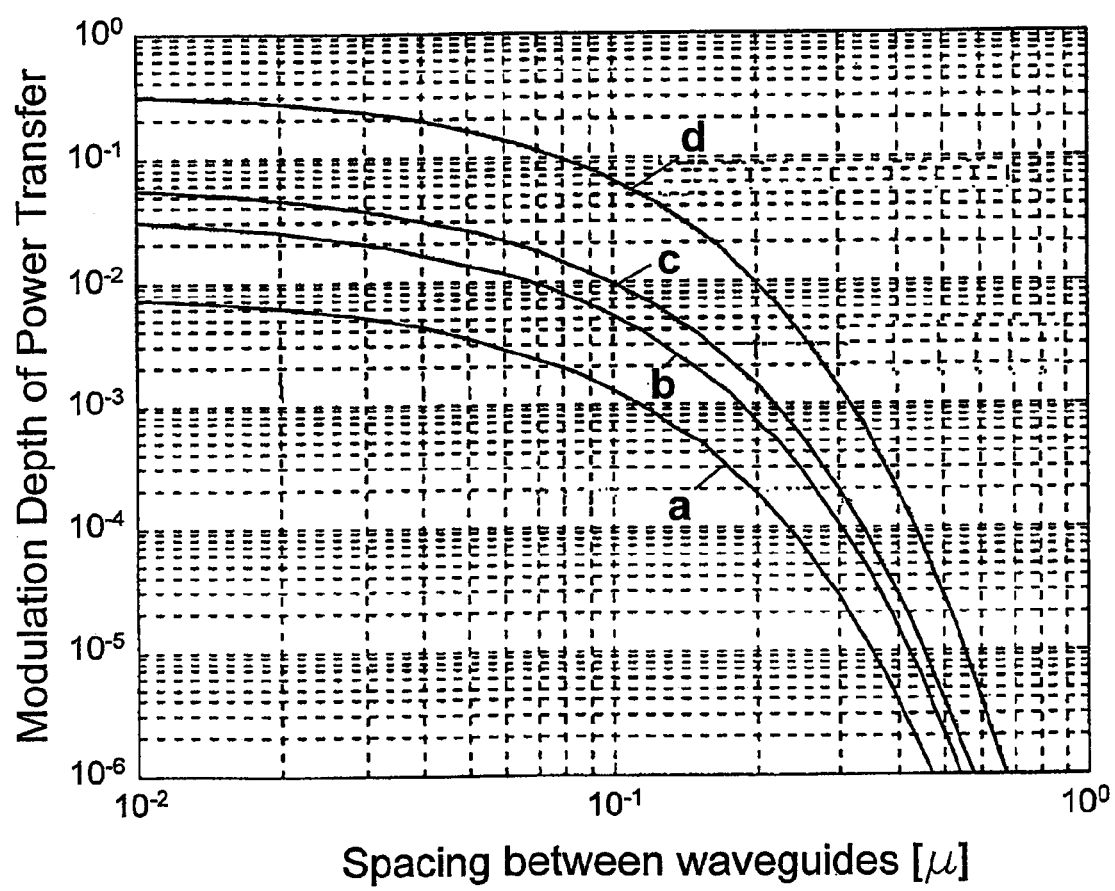
FIG. 14 shows the amount of power leakage, as a fraction of maximum mode power, from the main waveguide to the electrode as a function of spacing between the waveguides.

From these equations for the coupling between the two waveguides, the maximum amount of power that can leak from the main waveguide to the electrode as a function of poly-silicon thickness and oxide thickness (b) can be calculated. FIG. 14 shows the amount of power leakage, as a fraction of maximum mode power, from the main waveguide to the electrode as a function of oxide thickness (spacing between the waveguides) measured in microns. In the graphs of FIG. 14, the main waveguide has a thickness of $0.064\mu$ and the electrode a thickness of $1\mu$, $0.3\mu$, $0.2\mu$, and $0.1\mu$ in lines a, b, c, and d respectively.

From FIG. 14, it can be seen that workable parameters do exist. For example, an electrode 1 $\mu$m thick with an oxide cladding 200 Angstroms thick, will couple only 0.6% of the power.

As was mentioned hereinabove, there is a wide range of variation for most of the parameters in the realization of a specific device. In the remainder of this description, the values of the parameters are chosen so as to be compatible with standard SOI CMOS processes.

In order to have a 5 volt operating device and maximum applied electric field of 2 MV/cm, a gate oxide thickness of 250 A is chosen. The maximum induced charge in the MOS capacitor according to Gauss's law is $$N_{max} = C_{ox} x V_{g_{max}} / q = 4.3 \times 10^{12} cm^{-2}.$$

The total implant dose in the N+ region is taken to be $7.3 \times 10^{12}$ cm$^{-2}$ so that upon the application of −5V to the gate, the N+ region will be partially depleted, leaving about $3 \times 10^{12}$ cm$^{-2}$ free electrons. For the same gate voltage, an accumulation layer will be formed at the P regions with surface hole density of about $4.3 \times 10^{12}$ cm$^{-2}$. Changing the gate voltage will change the electron and hole surface densities in opposite directions.

At a specific value of the negative gate voltage, the effects of the two types of free carriers on the index of refraction will be the same, thus removing any modulation of the index of refraction along the waveguide. It is expected that the interaction of free holes with the electromagnetic wave is weaker than that of free electrons. Consequently a higher surface concentration of holes is chosen as compared to that of electrons in order to reach a condition of zero modulation when the negative gate voltage is applied. Under conditions of zero gate voltage, maximum modulation of the index of refraction exists since there is high surface density of free electrons and low density of free holes.

The amplitude of the modulation of the index of refraction is easily doubled by working with both polarities of the gate voltage. The doping levels of the N and P regions are altered such that at one polarity no modulation takes place while maximum modulation is obtained under the opposite polarity.

It should be also mentioned that due to the fact that the silicon layer is isolated from the substrate, voltage can be applied to the substrate also, in addition to the gate electrode. This fact can be used for additional doubling of the effect by using the silicon substrate as an additional bottom gate. In the case of integration of several devices on the same silicon die, implanted wells in the substrate are selectively used as bottom gates.

The concept behind the operation of the devices of the invention is based on the production of a relatively small electrically induced change in the value of the refractive index of the silicon core of the waveguide. This small change, on the order of 0.1%, is enhanced by the coherent contribution of thousands of elements of the periodic doping structure. In order to be able to use this small effect, any contribution to the modulation of the wave propagation, which has the same period but is not field dependent, must be eliminated in the manufacturing process of the devices.

In the approach of post processing electron trapping, this constraint is automatically fulfilled. However, in the case of processing induced modulation, this constraint imposes strict constraints on the structure of the device and it's processing. For example, the use of modulation of the structure of the gate electrode is prohibited, since it will induce a much stronger modulation in the waveguide. A similar problem arises if the gate oxide layer is grown after the ion implantation of the donors forming the N+ regions. This is due to the fact that N+ silicon oxidizes faster than lightly doped silicon. The resulting modulation in the silicon layer thickness and oxide thickness introduces a prohibitive fixed modulation in the waveguide. For the same reason, the ion implantation into the silicon layer is performed after the thermal oxide growth and the thermal anneal of the implant damage is carried out after the deposition of the poly silicon gate electrode.

According to a preferred embodiment of the invention, the device, including the waveguide, can be created by following a processing procedure comprising the following main steps:
 a.) choosing a SOI wafer with proper layer thickness but with additional thickness to the top silicon layer that will be consumed by all the oxidation steps including the growth of the 250 A gate oxide. The top silicon layer is P-type with acceptor density of $10^{17}$ cm$^{-3}$;
 b.) thin thermal oxide growth;
 c.) thin nitride deposition;
 d.) photolithography of the waveguide pattern;
 e.) nitride etch;
 f.) definition of the waveguide pattern by local oxidation of silicon or by trench isolation;
 g.) removal of top nitride and oxide;
 h.) growth of the gate oxide;
 i.) photolithography of the periodic N+ implant including contact regions;
 j.) ion implantation of arsenic: Dose=$7.3 \times 10^{12}$ cm$^{-2}$–Energy=60 KeV;
 k.) poly silicon deposition;
 l.) poly silicon doping;
 m.) photolithography of the gate electrode; and
 n.) continuing with standard steps for contacts, metallization and passivation.

It will be clear to those skilled in the art that many alternatives to the process described above which is intended to be illustrative and non-limitative.

Regarding step i) above, as was discussed hereinabove, the wavelength chosen for the example used in the description of the preferred embodiment of the invention is $1.5\mu$. In this case, the width of the reflected mode is about 15 A, i.e. 0.1% of the wavelength. This imposes a required accuracy on the period of the lithography of the same order of magnitude. Conventional lithography may not have this accuracy. There are at least three methods of overcoming this problem that may be employed in processing the devices of the invention:
 1. use of an e-beam for directly writing on the wafer;
 2. use of laser interferometry for directly writing on the wafer; and
 3. compensating for the fixed shift in the conventional lithography period by temperature change of the device during operation.

If the device is a switching matrix having multiple optical inputs/outputs, then a second level of waveguides is constructed. These waveguides can have a silicon nitride core and a silicon oxide cladding. These waveguides are optically coupled to specific first level silicon waveguides and cross over other silicon waveguides. These, second level waveguides may also serve to improve the coupling to the input/output optical fibers. This is because their vertical cross-section is about 3 microns high as compared to about 0.2 microns for the first level silicon waveguides.

The technology of the present invention is completely based on silicon and consists of elements commonly used in very large scale integration (VLSI) manufacturing. As a result, when compared to many other electro-optic technologies and devices, the proposed technology is extremely reliable. Also the manufacturing of the devices of the invention is based on the extremely efficient and high yield silicon technology where, on a single wafer, many functional devices are obtained. The fact that the devices of the invention are made of single crystal silicon, makes them relatively good candidates for automatic pig-tailing using V-groove technology, i.e. the devices of the invention are easily integrated into electro-optical systems. The fact that the electro-optical devices of the invention operate at gigahertz frequencies follows as a direct consequence of the fact that advanced SOI CMOS technology functions in this frequency regime. As a result of all of these facts in addition to the advantages described herein above, the technology and devices of the present invention represent a significant improvement over the prior art.

Although embodiments of the invention have been described by way of illustration, it will be understood that the invention may be carried out with many variations, modifications, and adaptations, without departing from its spirit or exceeding the scope of the claims.

The invention claimed is:

1. An optical device, comprising:
  a single-crystal silicon wafer, operative as a wave-guide channel, and defining a coordinate system of x;z axes and a length, along said z-axis; and
  at least one section of regions of alternating first and second indices of refractions, along said length, said regions of alternating first and second indices of refractions being controllable by an application of an electric field, so as to form an electric-field-induced Bragg grating.

2. The optical device of claim 1, and further including: proximal and distal sides, along said x-axis;
  a first silicon-dioxide layer, on said proximal side of said single-crystal silicon wafer, for forming a first cladding to said wave-guide channel; and
  a second silicon-dioxide layer, on said distal side of said single-crystal silicon wafer, for forming a second cladding to said wave-guide channel.

3. The optical device of claim 2, and further including:
  a silicon-nitride layer, on a proximal side of said first silicon-dioxide layer; and
  a third silicon-dioxide layer, on a proximal side of said silicon-nitride layer,
  thus forming an oxide-nitride-oxide structure on a proximal side of said wave-guide channel, wherein said regions of alternating first and second indices of regions are formed by laser interference spatially modulated internal photo emission of electrons, which are consequently trapped in said oxide-nitride-oxide structure.

4. The optical device of claim 3, and further including a poly-silicon layer, on a proximal side of said third silicon-dioxide layer, said poly-silicon layer being formed as patterned electrodes.

5. The optical device of claim 4, wherein said patterned electrodes are directly aligned with at least a portion of said at least one section of said regions of alternating first and second indices of refractions, within said wave-guide channel, wherein said application of said electric field is between said patterned electrodes and said at least said portion, said wave-guide channel, at said portion, being operative as a second electrode.

6. The optical device of claim 5, wherein said application of said electric field eliminates said regions of alternating first and second indices of refractions, thus eliminating said Bragg grating, by said electric field.

7. The optical device of claim 2, and further including a poly-silicon layer, on a proximal side of said first silicon-dioxide layer, said poly-silicon layer being formed as patterned electrodes.

8. The optical device of claim 7, wherein said patterned electrodes are directly aligned with at least a portion of said at least one section of said regions of alternating first and second indices of refractions, within said wave-guide channel, wherein said application of said electric field is between said patterned electrodes and said at least said portion, said wave-guide channel at said portion, being operative as a second electrode.

9. The optical device of claim 8, wherein said application of said electric field eliminates said regions of alternating first and second indices of refractions, thus eliminating said Bragg grating, by said electric field.

10. The optical device of claim 2, and further including a silicon substrate, on a distal side of said second silicon-dioxide layer.

11. The optical device of claim 1, wherein said single-crystal silicon wafer is n-type, and said regions of alternating first and second indices of refractions are formed by ion implantation to form p-type regions.

12. The optical device of claim 11, wherein said p-type regions are formed by lithographically controlled ion implantation during the processing of said wafer.

13. The optical device of claim 1, wherein said single-crystal silicon wafer is p-type, and said regions of alternating first and second indices of refractions are formed by ion implantation to form n-type regions.

14. The optical device of claim 13, wherein said n-type regions are formed by lithographically controlled ion implantation during the processing of said wafer.

15. The optical device of claim 1, wherein said at least one section of said regions of alternating first and second indices of refractions within said wave-guide channel, includes several sections of said regions of alternating first and second indices of refractions.

* * * * *